United States Patent
Dotaro et al.

(10) Patent No.: US 7,706,686 B2
(45) Date of Patent: Apr. 27, 2010

(54) ROUTER WITH RESOURCE ADD-DROP FUNCTIONALITY

(75) Inventors: Emmanuel Dotaro, Verrieres le Buisson (FR); Nicolas Le Sauze, Bures-sur-Yvette (FR)

(73) Assignee: Alcatel, Paris (FR)

( * ) Notice: Subject to any disclaimer, the term of this patent is extended or adjusted under 35 U.S.C. 154(b) by 1264 days.

(21) Appl. No.: 10/532,134

(22) PCT Filed: Oct. 21, 2003

(86) PCT No.: PCT/FR03/03103

§ 371 (c)(1),
(2), (4) Date: Apr. 20, 2005

(87) PCT Pub. No.: WO2004/039120

PCT Pub. Date: May 6, 2004

(65) Prior Publication Data

US 2006/0062578 A1    Mar. 23, 2006

(30) Foreign Application Priority Data

Oct. 21, 2002    (FR) .................................. 02 13053

(51) Int. Cl.
*H04J 14/00* (2006.01)
(52) U.S. Cl. ........................................................ 398/47
(58) Field of Classification Search .................. 398/49, 398/51
See application file for complete search history.

(56) References Cited

U.S. PATENT DOCUMENTS 6,115,517 A    9/2000  Shiragaki

| | | | |
|---|---|---|---|
| 6,512,612 B1 * | 1/2003 | Fatehi et al. | 398/49 |
| 6,701,088 B1 * | 3/2004 | Watanabe et al. | 398/51 |
| 6,792,208 B1 * | 9/2004 | Mukherjee et al. | 398/52 |
| 6,879,783 B1 * | 4/2005 | Nakahira | 398/51 |

FOREIGN PATENT DOCUMENTS

| | | |
|---|---|---|
| EP | 0 620 694 A | 10/1994 |
| EP | 1 052 808 A | 11/2000 |
| WO | WO 01 69834 A | 9/2001 |

OTHER PUBLICATIONS

L. Noirie, "Impact of intermediate traffic grouping on the dimensioning of multi-granularity optical networks", OFC 2001, Mar. 17-22, 2001.*

* cited by examiner

*Primary Examiner*—Shi K Li
(74) *Attorney, Agent, or Firm*—Carmen Patti Law Group, LLC

(57) ABSTRACT

A router includes a first processing module (1) adapted to route primary resources as a function of instructions received, inputs (2) adapted to feed the first processing module (1) with primary resources, outputs (3) adapted to collect primary resources switched by said first processing module (1), a second processing module (6) adapted to process secondary resources to be added or dropped, and coupling means (9) including a drop bus (8) and/or an add bus (7) and adapted, on the instructions of the control means (15), to drop either the whole of a primary resource arriving at one of said inputs (2) and/or outputs (3) or a portion thereof to feed said second processing module (6), and/or to add a secondary resource processed by said second processing module to a primary resource received at one of said inputs (2) and/or outputs (3) and in transit to a common destination.

3 Claims, 4 Drawing Sheets

ROUTER WITH RESOURCE ADD-DROP FUNCTIONALITY

Figure 1:
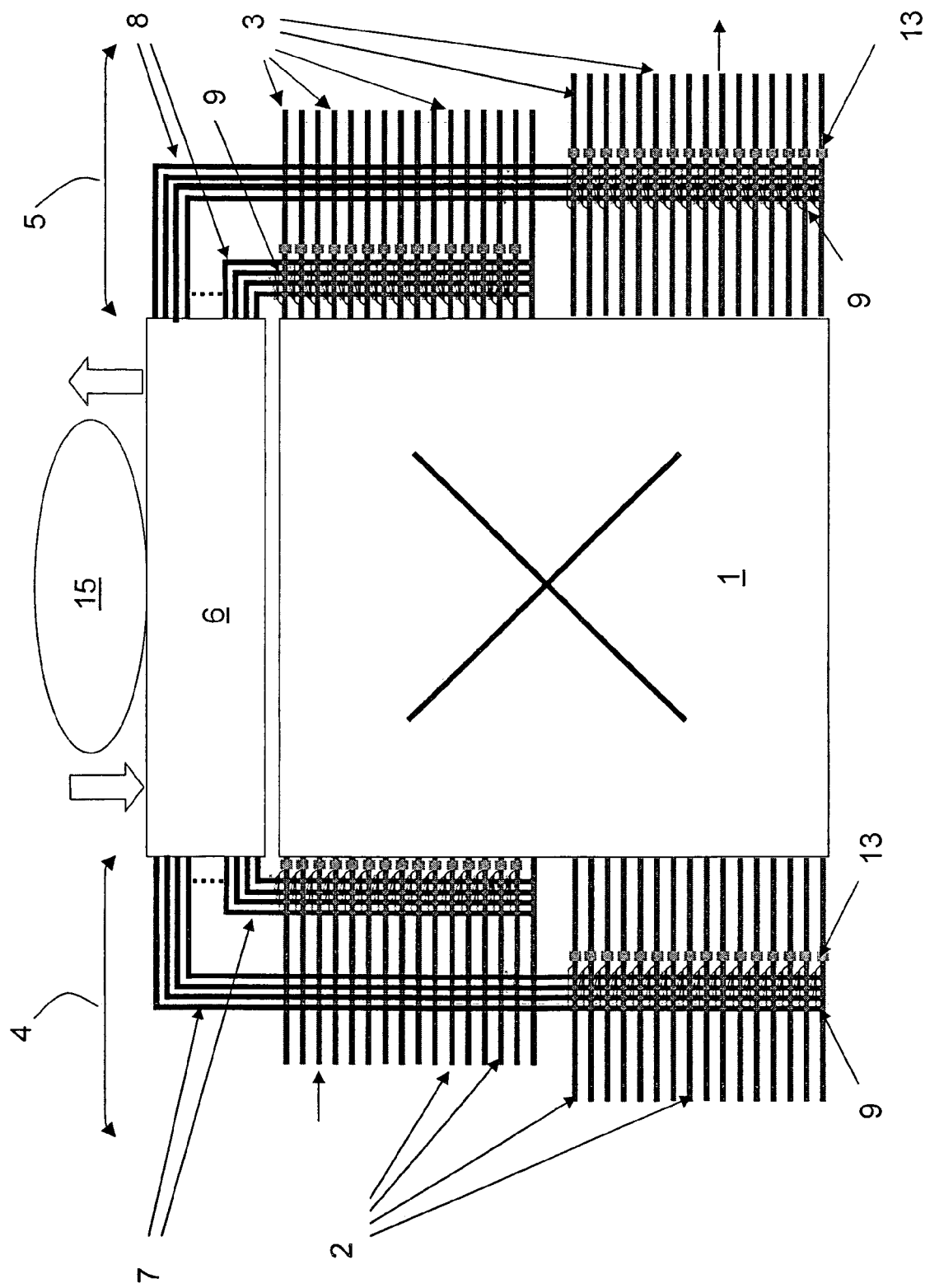

The invention relates to the field of routing systems, and more particularly to that of routing combined with adding and/or dropping optical or electronic resources such as data packets, packet frames (TDM circuits), wavelengths or bands of wavelengths.

Transferring data within a network is a complex operation that frequently necessitates, at various levels, adding information to or dropping information from the data being transferred or adding or dropping one or more wavelengths, in particular when transferring optically what are referred to in the art as "bursts" of data, such as optical protocol data units (OPDU). One particular proposal to enable such adding or dropping is to combine a router with an optical resource add/drop module. However, this combination does not allow true "on the fly" (i.e. real time) adding/dropping, especially in the case of bursts of data. This problem is accentuated by the complexity of the process of packetizing data at the borders of networks.

Thus an object of the invention is to solve this problem.

To this end it proposes a system for routing optical or electronic resources (data bursts, packet frames, wavelengths or bands of wavelengths), the system including a first processing module adapted to route optical or electronic primary resources as a function of instructions received, inputs adapted to feed said first processing module with optical or electronic primary resources, outputs adapted to collect primary resources switched by said first processing module, and control means adapted to control adding optical or electronic secondary resources to and/or dropping optical or electronic secondary resources from some of said received primary resources.

To be more precise, the system is characterized in that it includes a processing module adapted to process optical or electronic secondary resources to be added or dropped having a finer granularity than the primary resources, and coupling means including a drop bus and/or an add bus and adapted, on the instructions of the control means, to drop either the whole of an optical or electronic primary resource arriving at one of said inputs and/or outputs or a portion thereof to feed said second processing module, and/or to add an optical or electronic secondary resource processed by said second processing module to a primary resource received at one of said inputs and/or outputs and in transit to a common destination.

Accordingly, as soon as the control means discover that a received primary resource contains a destination common to that of a secondary resource, or a set of destinations including a destination common to that of a secondary resource, and that the primary resource in question has sufficient room to incorporate it, of course, the secondary resource in question is dropped from the second processing module and added to the received primary resource, by means of the add bus, at the input(s) (or the output(s)) that received it. Similarly, when the control means discover that at least a portion of a received primary resource must be dropped, for example for processing, that portion of the primary resource is immediately dropped, by means of the drop bus, and forwarded to the processing module.

Thanks to the invention, a secondary resource can therefore be added or dropped on the fly and it is no longer necessary to provide additional dedicated ports to add or drop resources.

From the point of view of resource granularity (whereby said resources can be classified in order of increasing (or decreasing) granularity, such as: data packet, augmented data packet, wavelength, band of wavelengths), the invention thus consists in providing a first module for processing (routing) primary resources having a first granularity (augmented packet, wavelength or band of wavelengths) and coupled by an add and/or drop bus to a second module for processing secondary resources having a second granularity (packet or wavelength) lower than the first granularity.

The device of the invention may have additional features, and in particular, separately and/or in combination:

- inputs (or outputs) fed with optical primary resources. In this case, at least some of the inputs (or outputs) are equipped with optical-electronic-optical conversion means and the add (or drop) bus is of electronic type, or the add (or drop) bus is of optical fiber type. Alternatively, at least some of the inputs (or outputs) are equipped with optical-electronic conversion means and the add (or drop) bus is of electronic type;
- inputs (or outputs) fed with electronic primary resources. In this case, at least some of the inputs (or outputs) are equipped with electronic-optical-electronic conversion means and the add (or drop) bus is of optical fiber type, or the add (or drop) bus is of electronic type. Alternatively, at least some of the inputs (or outputs) are equipped with electronic-optical conversion means and the add (or drop) bus is of optical fiber type;
- at least some inputs and/or at least some outputs including a regeneration module, in particular of 3R type;
- an input interface comprising the inputs and the add bus or the drop bus;
- an output interface comprising the outputs and the drop bus or the add bus;
- coupling means able to include a first multiplicity of first passive combination and/or separation elements each coupled to a bus channel (for example a fiber), a second multiplicity of second passive combination and/or separation elements each coupled to an input or an output, and groups of switching elements each coupled to a group of channels of a bus via said associated first passive element and to an input or an output via said associated second passive element;
- a first processing module of "packet switching" type, in which case the second processing module comprises a memory, possibly of "shared" type, adapted to store data packets forming secondary resources to be added to primary resources received in the form of bursts or frames of data packets (in the case of TDM circuits) or dropped from primary resources received in the form of bursts or frames of data packets. Moreover, the coupling means may be adapted to add said dropped data packet at the end of said received burst or at a reserved location of said received data packet frame;
- a first processing module that can be of "wavelength-band switching" type or "wavelength switching" type;
- a second processing module adapted to receive data packets constituting secondary resources to be added by said coupling means to a wavelength constituting a received primary resource and to recover data packets constituting secondary resources dropped by said coupling means from at least one wavelength constituting a received primary resource;
- a second processing module that can comprise wavelength switching means adapted to receive from said coupling means a wavelength dropped from said received primary resources and/or to process a wavelength to be added by said coupling means to a primary resource. In this case, the second processing module can comprise processing means, such as optoelectronic (optical-electronic or electronic-optical) conversion means or regeneration means, in particular of 3R type.

Figure 2:
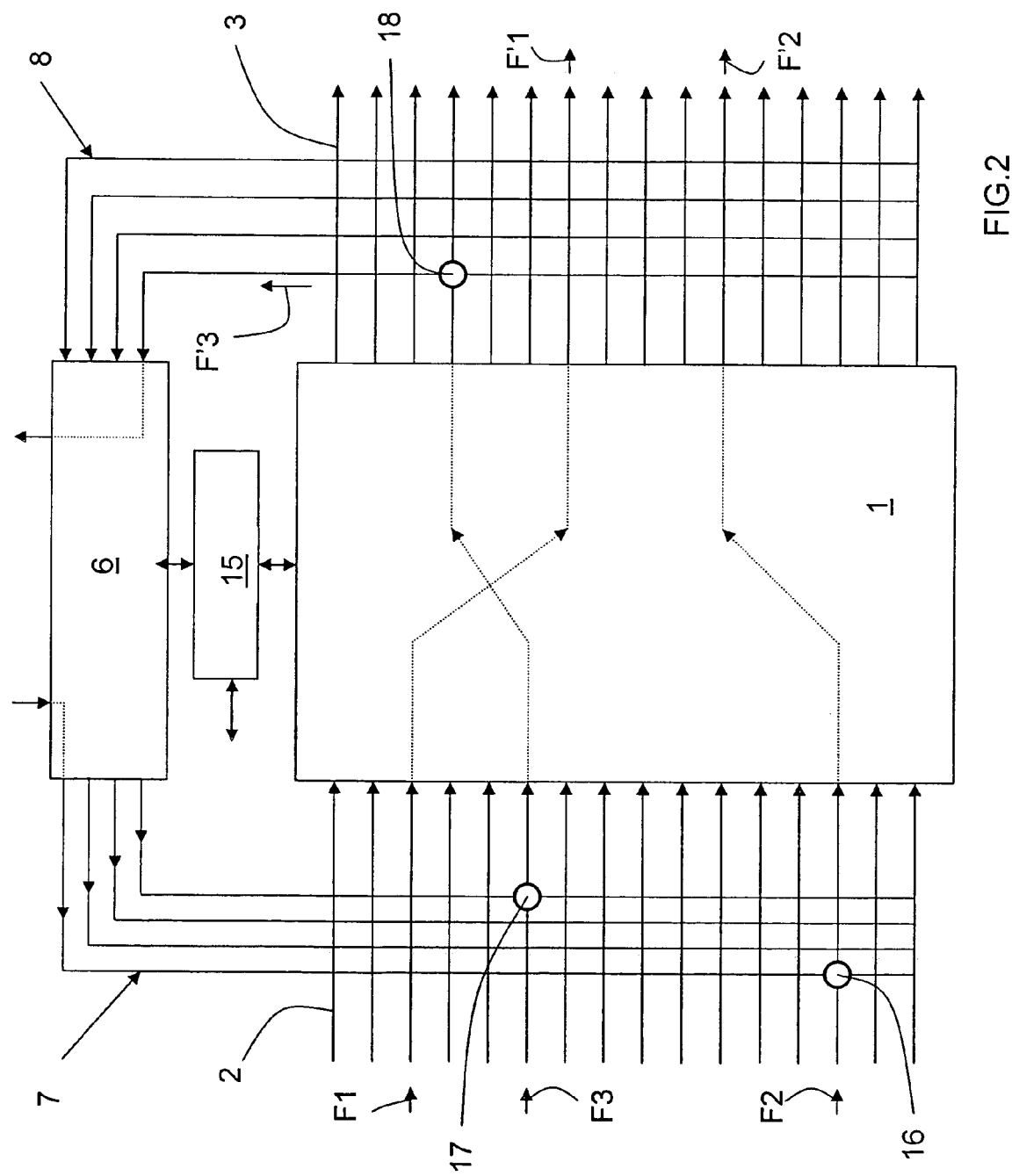
Figure 3:
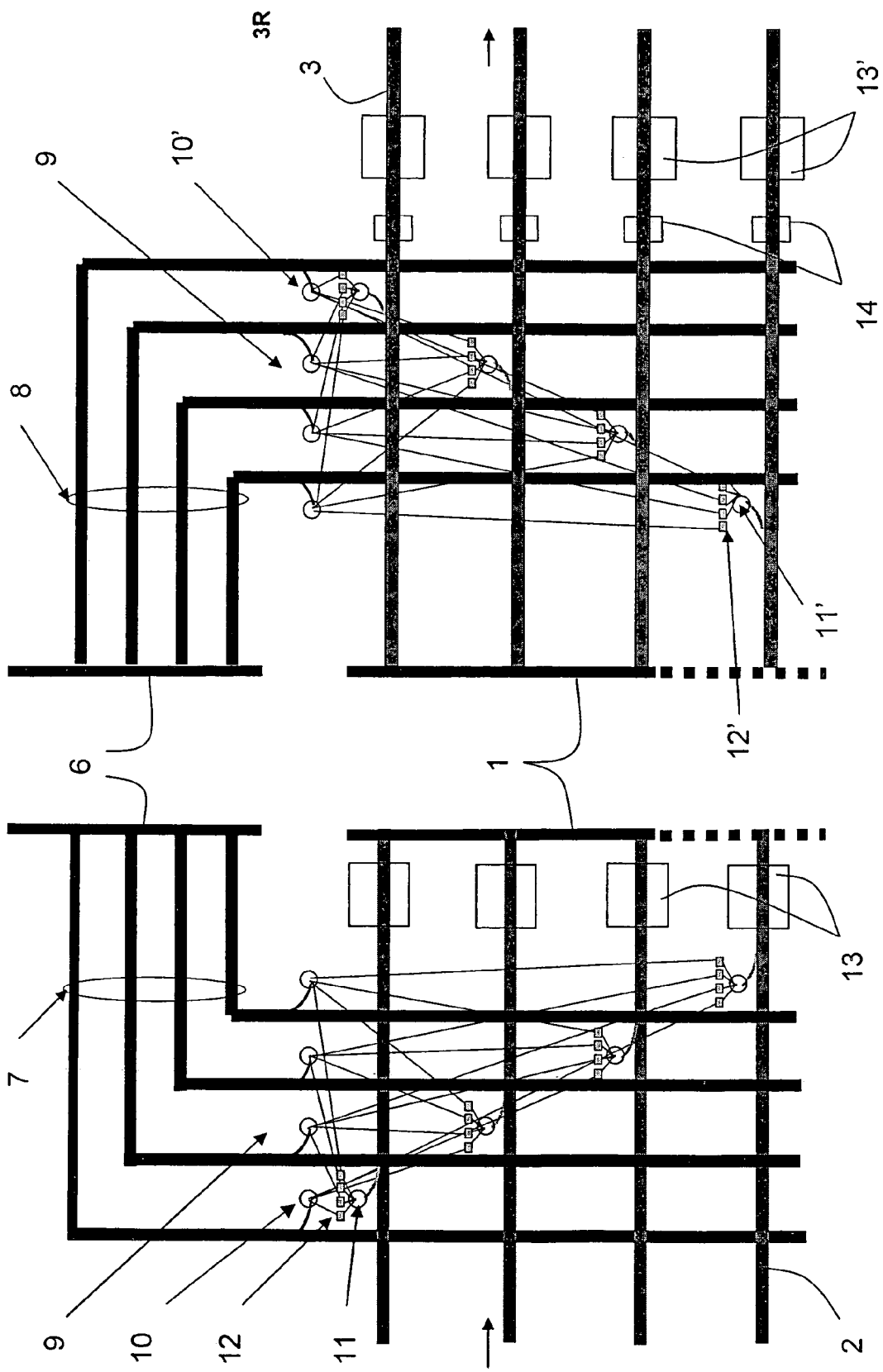
Figure 4:
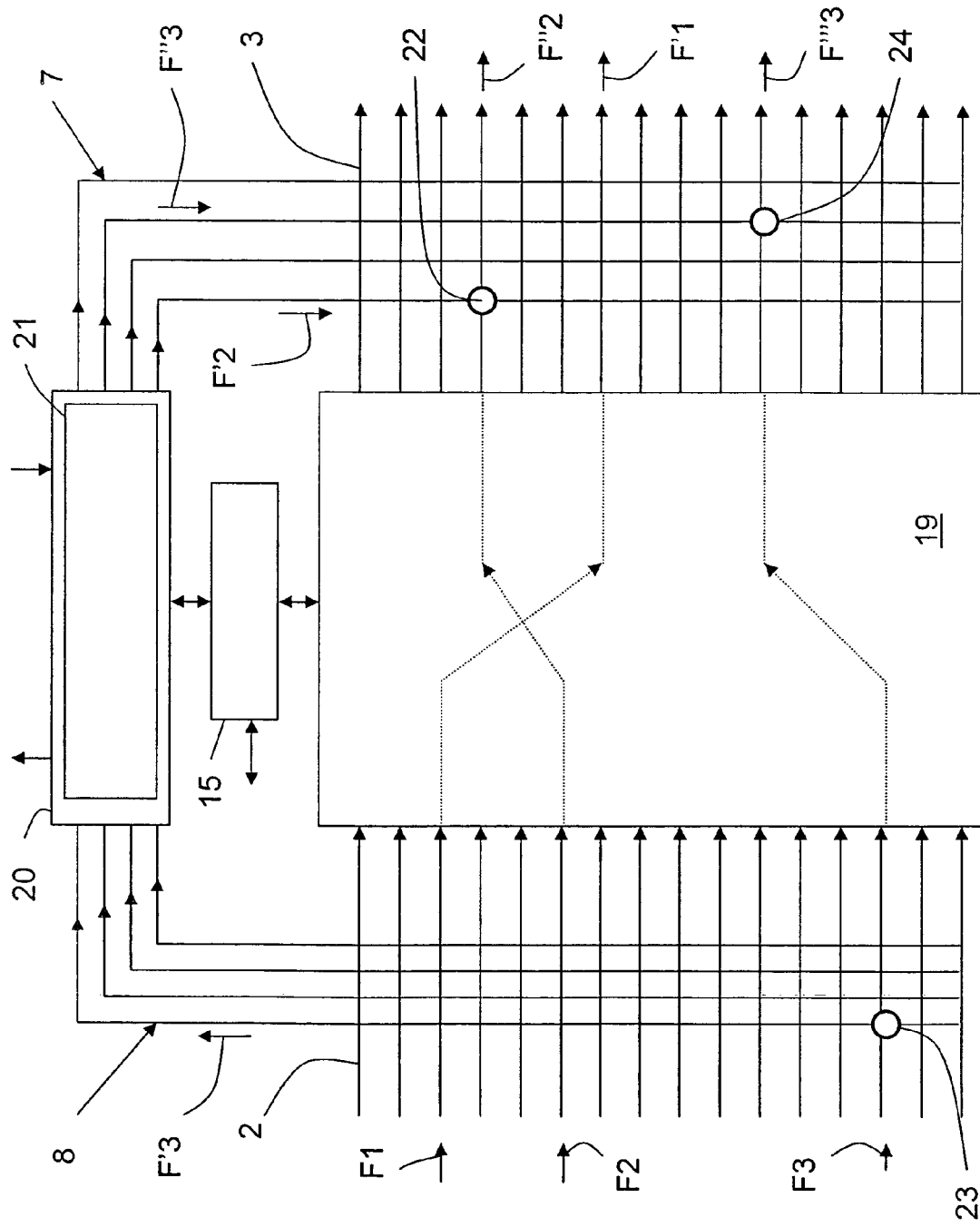

Other features and advantages of the invention will become apparent on reading the following detailed description and examining the appended drawings, in which:

FIG. 1 is a diagram of a first embodiment of an optical routing system of the invention, FIG. 2 is a functional block diagram of the FIG. 1 embodiment, FIGS. 3A and 3B show in detail the input and output interfaces of the FIG. 1 system, and FIG. 4 is a functional block diagram of a second embodiment of an optical routing system of the invention.

The appended drawings constitute part of the description of the invention and may, if necessary, contribute to the definition of the invention.

A first embodiment of an optical router of resources in the form of data packets or bursts of data packets is described first with reference to FIGS. 1 to 3.

In the following description the primary resources to be routed are optical resources and are not subject to any optoelectronic conversion after reception, to be more precise to any optical-electronic (O/E) or optical-electronic-optical (O/E/O) conversion. However, the invention applies equally to routing optical primary resources that are subject to optoelectronic conversion at the input and/or at the output and to routing electronic primary resources with or without optoelectronic conversion, to be more precise electronic-optical (E/O) or electronic-optical-electronic (E/O/E) conversion.

The router shown includes a first processing module taking the form of a "non-blocking" optical switching module 1 defining $\underline{n}$ inputs and $\underline{m}$ outputs ($\underline{n}$ and $\underline{m}$ being integers and preferably being equal), connected to an input optical fiber 2 and to an output optical fiber 3, respectively. The input optical fiber 2 and the output optical fiber 3 are preferably integrated into an input interface 4 and an output interface 5.

When the input interface 4 and the output interface 5 are to be connected to a demultiplexer and to a multiplexer, respectively, their fibers 2, 3 are chosen to receive photons at a demultiplexed wavelength that constitute primary resources. For example, the input interface 4 may include 40 input fibers 2 defining 40 channels spaced by 50 or 100 GHz from the wavelength 1529 nm to the wavelength 1561 nm.

The switching module 1 is selected to switch, and the input optical fiber 2 and the output optical fiber 3 are selected to route, bursts of data packets such as optical protocol data units (OPDU) of fixed or variable size.

The router further includes a second processing module 6 consisting either of a shared memory, as shown in the figures, or a conventional memory coupled to a switch. Shared memory is advantageous because it enables any output of the second processing module 6 to be addressed at anytime.

The memory receives data packets constituting secondary resources that have to be transferred to a defined address and recovers data packets (secondary resources) dropped from received bursts of data packets (primary resources), either because of access contention at the output of the router, i.e. because there are insufficient transit wavelengths available at the router output, or because they are to undergo local processing (the local processing may apply either to the whole of a received primary resource or to a portion thereof).

This memory, which is lumped together with the second processing module 6 below, is connected by coupling means 9 described later, firstly, to the input fibers 2 by one or more add buses 7, which here are of optical fiber channel type, given that the primary and secondary resources are of optical type and are not subject to any optoelectronic conversion in this example, and, secondly, to the output fibers 3 by one or more drop buses 8, which here are of optical fiber channel type, given that the secondary resources processed and the primary resources routed are of optical type and are not subject to any optoelectronic conversion in this example.

The add bus 7 and the drop bus 8 preferably form part of the input interface 4 and the output interface 5, respectively. The optical fibers of the buses 7, 8 are preferably combined into groups of j, j' fibers each intended to be coupled to groups i, i' of input optical fibers 2 or output optical fibers 3 via coupling means 9 (preferably j=j'=4 and i=i'=16). However, the numbers of fibers in the groups of the add bus 7 and the drop bus 8 can be different, of course.

As shown in FIGS. 3A and 3B, the coupling means 9 comprise two portions respectively adapted to couple the fibers of the add bus 7 to the input fibers 2 and the fibers of the drop bus 8 to the output fibers 3. The first portion of the coupling means 9 preferably includes, firstly, $\underline{j}$ first coupler type passive combination and/or separation elements 10 each coupled to a fiber of the add bus 7, secondly, $\underline{i}$ second concentrator type passive combination and/or separation elements 11 each coupled to an input fiber 2, and, thirdly, i groups of j optical switching elements 12, preferably of "1 to 1" (1:1) optical gate, for example semiconductor optical amplifier (SOA), type, each coupled to a group of j fibers of an add bus 7 via the associated first passive element 10 and to an input fiber 2 via its associated second passive element 11.

Similarly, the second portion of the coupling means 9 preferably includes, firstly, j' first concentrator type passive combination and/or separation elements 10' each coupled to a drop bus fiber 8, secondly, i' second coupler type passive combination and/or separation elements 11' each coupled to an output fiber 3, and, thirdly, i' groups of j' switching elements 12', preferably of "one to one" (1:1) optical gate, for example SOA, type, to a group of j' fibers of a drop bus 8 via their associated first passive element 10' and to an output fiber 3 via the associated second passive element 11'.

Moreover, each input fiber 2 preferably includes a re-amplification, reshaping and resynchronization (3R) type regeneration module 13. Each 3R type regeneration module 13 is preferably on the downstream side of the point of coupling between its input fiber 2 and the second passive element 11 associated with that fiber and coupling it to the memory 6.

Each output fiber 3 may also include a regeneration module 13', for example of 3R type. Each 3R type regeneration module 13' is preferably on the downstream side of the point of coupling between its output fiber 3 and the second passive element 11' associated with that fiber and coupling it to the shared memory 6. Each output fiber 3 also includes, between the point at which it is coupled to the coupling means 9 and the 3R type regeneration module 13', an optical switching element 14 of "1 to 1" (1:1) optical gate, for example SOA, type, to enable the elimination at the output of the switching module 1 of either the whole of a received primary resource that has to be sent to the memory 6 via the coupling means 9 or a portion thereof.

Finally, the optical routing system of the invention includes a control module 15 for controlling the operation of the memory 6, the coupling means 9 (10-12 and 10'-12'), the switching module 1, the input interface 4, the output interface 5, and the 1:1 switching elements (14).

The optical routing system has two modes of operation. The first mode relates to adding resources, here data packets, and the second mode relates to dropping either the whole of a resource, here data packets, or a portion thereof.

In the first mode of operation, when a burst of data, here of OPDU type, arrives on the input fibers 2 of the input interface 4, the control module 15 is immediately alerted by an in-band or out-of-band control system which analyses, for example, the occupancy of the received primary resource (OPDU) and its destination or set of destinations (the primary resource may have a plurality of destinations in a broadcast or multicast situation). It then verifies if the memory 6 contains one or more packets awaiting transfer to the same destination as the OPDU or to one of the destinations in its set of destinations.

If this is not the case, the OPDU is forwarded to the switching module 1 in order to be switched as a function of instructions received and under the control of the control module 15. The switched OPDU is then collected by one or more output fibers 3 of the output interface and forwarded to a multiplexer, for example. This is represented in FIG. 2 by the path indicated by the arrows F1 and F'1. It is important to note that the add bus 7 and the drop bus 8 shown diagrammatically in FIG. 2 do not necessarily cover all of the inputs 2 and the outputs 3 that feed and serve the first processing module 1, although this is the case in FIG. 1.

If, however, one or more data packets are awaiting transfer to the same destination as the received OPDU, or to one of its destinations, the control module 15 verifies if the size of the OPDU allows those packets to be added, preferably behind the OPDU. This can be verified by detecting signaling information or a signal delivered by a photodiode representative of the size of the OPDU (or the received optical primary resource). If adding is possible, the control module 15 configures the coupling means 9 so that they fetch from the memory 6 the data packets to be transferred and route them via the add bus 7 to the input fiber(s) 2 that received the OPDU, at the point of coupling to the associated second passive element 11. This creates an "augmented" burst (or OPDU) and the control module 15 updates the signaling information.

The augmented OPDU is then forwarded to the switching module 1 (or first processing module) to be switched as a function of instructions received and under the control of the control module 15. This switching is effected normally because the switching module 1 sees the augmented OPDU as a new "atomic entity". The switched augmented OPDU is then collected by one or more output fibers 3 of the output interface 5 and forwarded to a multiplexer, for example. This is represented in FIG. 2 by the path indicated by the arrows F2 and F'2 (the circle 16 represents the point of coupling between the input fiber 2 that received the OPDU and the coupling means 9).

In the second embodiment, dropping results either from the fact that the dropped data packet(s) has/have reached their destination and must be forwarded to another device of the communications installation, or from access contention at the output of the router, preventing the transmission of either the whole of a resource or a portion thereof. In either of these situations, the control module 15 configures the coupling means 9 so that they drop the designated data packet(s) (or OPDU) reaching the output fibers 3 at their point of coupling with the associated second passive element 11'. The packet(s) concerned are then forwarded via the drop bus 8 to the second processing module 6 and stored in memory. The data packet(s) is/are then either forwarded to an external device or retained in the memory 6, in order to be added subsequently to a future OPDU in transit either to the same destination as itself or to a set of destinations of which one is identical to its own. These two situations are represented in FIG. 2 by the path indicated by the arrows F3 and F'3 (the circle 17 represents the point of coupling between the input fiber 2 that receives the OPDU and the coupling means 9 and the circle 18 represents the point of coupling between the output fiber 3 that received the OPDU and the coupling means 9).

The router that has just been described with reference to FIGS. 1 to 3 may also be used for routing other types of primary and secondary resources, combined with adding and/or dropping, and subject to certain adaptations, of course, in particular at the level of the types of module constituting the first processing module 1 and the second processing module 6.

Accordingly, this router can be used to route primary resources of packet frame type (in the case of TDM circuits) or wavelength type, combined with adding and/or dropping primary resources of packet type.

In this case, the second processing module 6 is again a memory, preferably a shared memory, but the control module 15 is significantly simpler than in the situation described above, in that the path of the primary resources is pre-established (this is referred to as operation in "circuit" (or connected) mode, as opposed to "packet" (or non-connected) mode). Also, in the case of routing wavelengths, for example, the first processing module 1 is a wavelength switch and the MAC function is used to add packets to a wavelength. This necessitates an analysis of the "gaps" present in the wavelength, for example by detecting the intensity of a signal delivered by a photodiode (CSMA-CA mode), and that analysis necessitates the use of delay lines whose delay depends on the size of the packet to be sent, for example.

The router described above may also have a configuration different to that shown in FIGS. 1 to 3, whether it is a matter of primary resources of augmented packet, packet frame (in the case of TDM circuits) or wavelength type. Thus the add bus 7 and the drop bus 8 may be interchanged so that they are respectively on the upstream side of the first processing module 1 (in the input interface) and on the downstream side of the first processing module 1 (in the output interface).

A second embodiment of an optical router for primary resources taking the form of bands of wavelengths is described next with reference to FIG. 4.

This embodiment has certain similarities to that described above with reference to FIGS. 1 to 3. Consequently, components that are substantially identical in the two embodiments, in terms of their functions, are designated by the same reference numbers and are not described again. Also, like the first embodiment, this second embodiment could be used in the context of routing electronic primary resources.

In this second embodiment, the input interface 4 includes the drop bus 8 that feeds the second processing module 20 and the output interface 5 includes the add bus 7 that is fed by said second processing module 20. Also, the first processing module is a switch 19 for switching bands of wavelengths, for example, and the second processing module is a switch 20 for switching wavelengths, for example. It is now a question of making available to the first and/or second processing modules 19, 20 one or more functions that do not exist in the other processing module. Also, this optical router exploits "gaps" in the bands of wavelengths to which one or more wavelengths may be added with or without processing. By definition, a band of wavelengths has a "gap" in it when at least one of the wavelengths is not used.

The wavelength band switch 19 is fed with bands of wavelengths by the various input fibers 2, each of which is adapted to carry a plurality of different wavelengths. The wavelength band switch 19 feeds bands of wavelengths to the output fibers 3, each of which is also adapted to carry a plurality of different wavelengths. An input fiber 2 or an output fiber 3 can thus define thirty-two channels in the form of eight bands each of four different wavelengths or four bands each of eight different wavelengths or even a single band of thirty-two different wavelengths (contained in a single fiber), for example.

The wavelength switch 20 is of cross-connect type and is preferably opaque. To this end it includes an optoelectronic conversion module 21 and/or a 3R type regeneration module. Consequently, in this embodiment, there is no utility in providing "on-line" regeneration modules, i.e. regeneration modules on the feed fibers 2 and/or output fibers 3 coupled to the band switching module 19.

In the case of regeneration only, no new wavelength (or secondary resource) is added to a band of wavelengths (or primary resource); a regenerated wavelength is merely reintroduced into a band of wavelengths. However, simultaneously adding one or more regenerated wavelengths and one or more new wavelengths could be envisaged, of course.

As in the first embodiment, this optical routing system has two modes of operation. The first mode relates to adding wavelengths with or without additional processing and the second mode relates to dropping wavelengths, where applicable for processing.

In the first mode of operation, the control module 15 is immediately advised when a band of wavelengths reaches the input interface 4 on one or more input fibers 2 thereof. It also knows in advance the destination of the band of wavelengths received, and has therefore configured the band switching module 19 to line the input(s) 2 up with the appropriate output(s) 3.

The control module 15 verifies if there exist(s) in the wavelength switch 20 one or more wavelengths to be added to a receive band of wavelengths and whose destination is identical to that of that band or to one of the destinations in its set of destinations.

If this is not the case, the band switching module 19 switches the band of wavelengths under the control of the control module 15. The switched band of wavelengths is then collected by one or more output fibers 3 of the output interface 5 and forwarded. This situation is represented in FIG. 4 by the path indicated by the arrows F1 and F'1. It is important to note that the add bus 7 and the drop bus 8 shown diagrammatically in FIG. 4 do not necessarily cover all of the inputs 2 and the outputs 3 that serve and feed the first processing module 19, although this is the case in FIG. 1.

If, however, there is one or more wavelengths at the wavelength switch 20 that has a destination identical to that of the received band or to one of the destinations in its set of destinations, the control module 15 verifies that there is sufficient space available in that band to add to it the wavelength(s) to be transferred. This can be verified by detecting signaling information or the state of a photodiode. If the wavelength(s) to be transferred can be added, the control module 15 configures the add bus 7 and the portion 10-12 of the coupling means 9 to add those wavelength(s) to the band of wavelengths switched at the same time by the band switching module 19 to the appropriate output fibers 3. This creates an "augmented" band of wavelengths and the control module 15 updates the signaling information. This situation is represented in FIG. 4 by the path indicated by the arrows F2, F'2 and F"2 (the circle 22 represents the point of coupling between the coupling means 9 and the output fiber 3 that received the band of wavelengths switched by the band switching module 19).

In the second mode of operation, dropping results either from the fact that the wavelength(s) to be dropped has/have reached their destination and must be transferred to the wavelength switching module 20, in order to undergo conversion and/or regeneration processing therein, or to another device of the communications installation, or from access contention at the output of the router.

In either of those situations, the control module 15 configures the coupling means 9 so that they drop from the input fibers 2 via the drop bus 8 the wavelength(s) to be transferred to the wavelength switching module 20. The wavelength(s) concerned is/are then either forwarded to an external device or to the conversion and/or regeneration module 21 or retained in order to be added subsequently into a future band of wavelengths in transit to the same destination as its/their own or to a destination in its set of destinations identical to its/their own.

In the first situation, i.e. in the event of the bus 7 and the drop bus 8 not covering all the inputs 2 and outputs 3, there are two cases to be envisaged, according to whether dropping is partial or total.

If the whole of the band of wavelengths must be dropped in order to be forwarded or processed, the dropped wavelengths follow the path indicated by the arrows F3 and F'3 in FIG. 4 (the circle 23 represents the point of coupling between the input fiber 2 that received the band of wavelengths and the coupling means 9). In the event of local processing, the band of wavelengths is then routed over the appropriate output fiber 3 via the add bus 7 and the coupling means 9 along the path indicated by the arrows F"3 and F'"3 in FIG. 4 (the circle 24 represents the point of coupling between the coupling means 9 and the output fiber 3).

If only a portion of the band of wavelengths must be dropped in order to be forwarded or processed, the wavelength(s) extracted follow(s) the path indicated by the arrows F3 and F'3 in FIG. 4 (the circle 23 represents the point of coupling between the input fiber 2 that received the band of wavelengths and the coupling means 9), whereas the wavelengths that are not dropped are switched by the band switching module 19 to the appropriate output fiber 3. This partial dropping is effected either by filtering, for example by means of a demultiplexer coupled to "1 to 1" switches, or by a tunable filter.

In the event of local processing, the wavelength(s) is/are then routed over the appropriate output fiber 3 via the add bus 7 and the coupling means 9 in order to be integrated into the remainder of the band switched by the band switching module 19. This situation is indicated by the arrows F"3 and F'"3 in FIG. 4 (the circle 24 represents the point of coupling between the coupling means 9 and the output fiber 3).

In the second situation, represented in FIG. 4 by the path indicated by the arrows F3 and F'3, the whole of the receive band of wavelengths must be dropped in order to be reintegrated into the traffic once contention has terminated.

As indicated above, in the second embodiment, the switching module 19 is not necessarily a module for switching bands of wavelengths. It can be a module for switching wavelengths.

The invention is not limited to the embodiments of a router described above by way of example only, and encompasses all variants that the person skilled in the art might envisage that fall within the scope of the following claims.

Thus there have been described above routers equipped with an add bus and a drop bus, possibly combined into a single add/drop bus. However, a system of the invention that comprises only an add bus or only a drop bus may be envisaged.

Also, there have been described above routers for routing optical primary resources with no optoelectronic conversion means at the input or output. However, the invention applies equally to routers for routing optical primary resources equipped with optoelectronic conversion means at the input and/or output, as well as to routers for routing electronic primary resources, whether or not equipped with optoelectronic conversion means.

The invention claimed is:

1. A resource router including a first processing module (1, 19) adapted to route primary resources as a function of instructions received, inputs (2) adapted to feed said first processing module (1, 19) with primary resources, outputs (3) adapted to collect primary resources switched by said first processing module (1, 19), and control means (15) adapted to control adding secondary resources to and/or dropping secondary resources from some of said received primary resources, which router is characterized in that it includes:

a second processing module (6, 20) comprising a memory adapted to store secondary resources including data packets to be added to primary resources, the secondary resources having a finer granularity than the primary resources; and coupling means (9) including a drop bus (8) and/or an add bus (7) and adapted, on the instructions of the control means (15):

to drop either the whole of a primary resource arriving at one of said inputs (2) and/or outputs (3) or a portion thereof to feed said second processing module (6, 20), and/or to add a secondary resource processed by said second processing module to a primary resource received at one of said inputs (2) and/or outputs (3) and in transit to a common destination;

said control means (15) being suitable for analyzing the occupancy of a received primary resource received at one of said inputs (2) and/or outputs (3) and in transit and for verifying in the memory whether there exists at least one packet awaiting transfer to at least one destination in common with said received primary resource;

said coupling means (9) being adapted to add said at least one packet stored in the memory in said received primary resource on an order from the control means (15);

wherein said coupling means (9) include a first multiplicity of first passive combination and/or separation elements (10, 10') each coupled to a bus channel (7, 8), a second multiplicity of second passive combination and/or separation elements (11, 11') each coupled to an input (2) or to an output (3), and groups of switching elements (12, 12') each coupled to a group of channels of a bus (7, 8) via said associated first passive element (10, 10') and to an input (2) or to an output (3) via said associated second passive element (11, 11').

2. A router according to claim 1, characterized in that said first processing module (19) is of "wavelength switching" type.

3. A router according to claim 2, characterized in that said second processing module (6) is adapted to receive data packets constituting secondary resources to be added by said coupling means (9) to a wavelength constituting a received primary resource and to recover data packets constituting secondary resources dropped by said coupling means (9) from at least one wavelength constituting a received primary resource.

* * * * *